July 11, 1967  R. B. LURSKI  3,330,539
MIXING IMPLEMENT
Filed July 11, 1966  2 Sheets-Sheet 1
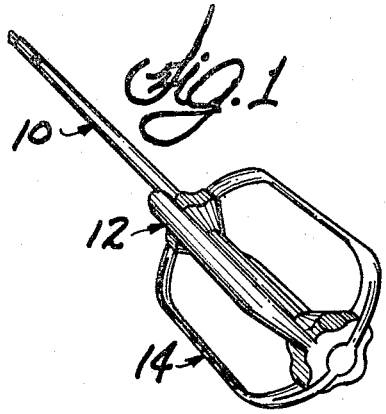
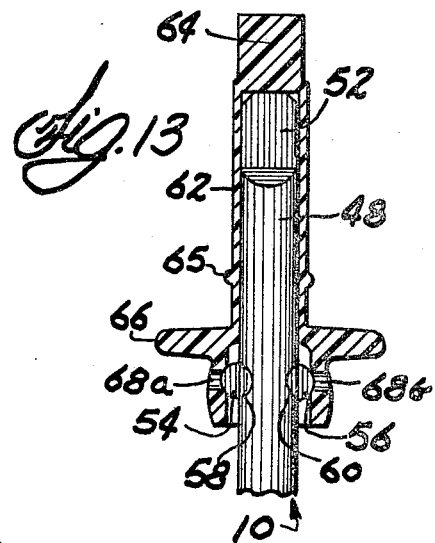
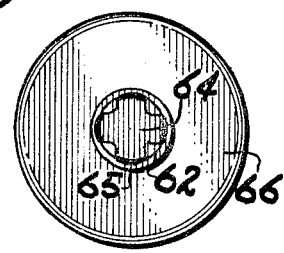
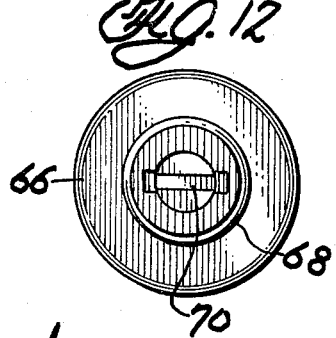
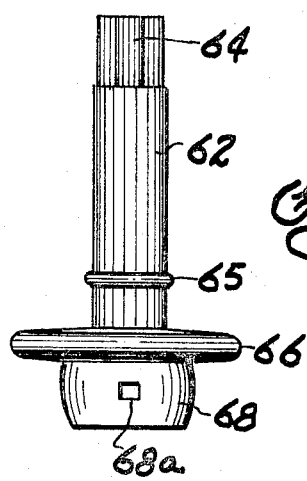
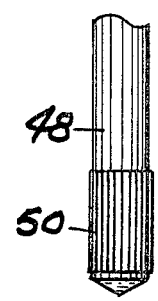
INVENTOR.
Robert B Lurski
BY Pendleton, Neuman,
Seibold & Williams
Attorneys

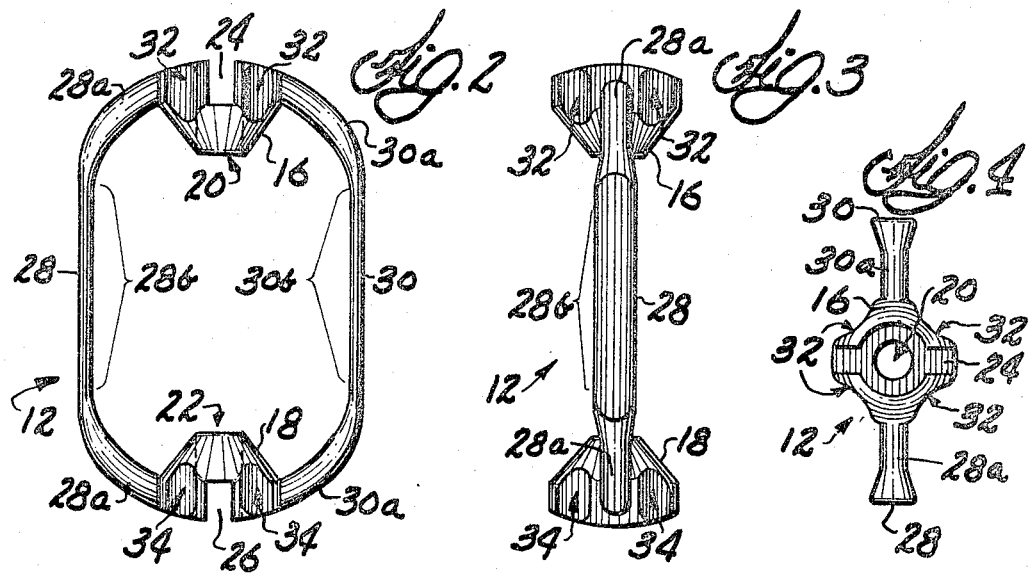
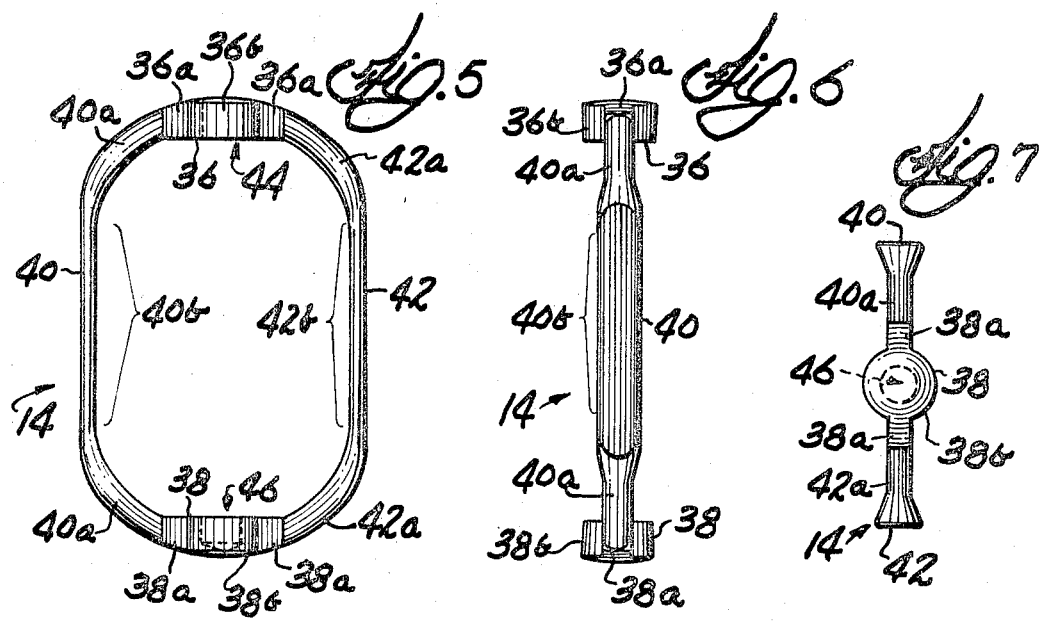

United States Patent Office

3,330,539
Patented July 11, 1967

3,330,539
MIXING IMPLEMENT
Robert B. Lurski, Oak Park, Ill., assignor to Club Aluminum Products Company, La Grange Park, Ill., a corporation of Illinois
Filed July 11, 1966, Ser. No. 564,247
9 Claims. (Cl. 259—138)

This invention relates to a rotatable mixing, stirring or beating implement adaptable for use as the driven element of power-driven tools such as electric kitchen mixers. More specifically, it relates to Teflon-compatible, rotatable beater blades of high mixing efficiency which may be manufactured and assembled inexpensively and can be readily cleaned so as to meet sanitary requirements.

Power-driven mixing devices such as the well-known electric kitchen mixer are in wide use today. Unfortunately, the metallic mixing blades thereof tend to scratch, scrape or otherwise mar the non-stick coatings on kitchen cookware, which have gained wide popularity in recent years, e.g., Teflon (E. I. du Pont de Nemours & Co.'s registered trademark for its non-stick plastic coating consisting of a tetrafluoroethylene polymer).

The development of non-metallic substitute blades which will not mar the non-stick coatings has presented unexpected difficulty. Plastics which are soft enough to be compatible with (i.e., won't mar) the non-stick coatings are subject to such excessive flexure that clashing of intermeshing blades would often result. Further, the molding of plastic mixers having more than two blades, e.g., the desirable four-bladed mixing implement, requires expensive four-piece molds which involve substantial manufacturing costs, including labor. Attempts to mold the structure in two or more pieces for further assembly would heretofore have resulted in further excessive manufacturing costs and would have introduced the problem of cleaning difficulties, "food pockets" and generally unsanitary design. Still further, the desired flat surfaces for the plastic mixing blades would result in excessive frictional forces when such blades rub against the internal surfaces of the cookware, particularly at the juncture of the side walls and bottom.

It is therefore an object of the present invention to provide a mixing implement which is free of the above difficulties. It is a more specific object to provide a non-stick-coating-compatible, four-bladed mixing device of sufficient strength to avoid undue flexure and clashing of intermeshing blades. It is another object to provide a Teflon-compatible mixing implement which does not require expensive molds and can be readily assembled from the component parts. It is still another object to provide a mixing implement of sanitary design, which implement has the desired flat-bladed configuration and yet presents minimal surfaces at the juncture of the bottom and side walls of the cookware. These and other objects of the present invention will become apparent from the following detailed description thereof.

To achieve these objects a multi-bladed mixing implement is provided which comprises a two-piece, "snap-assembled" plastic mixer blade construction and a centrally-disposed metallic drive shaft which locks the construction together and strengthens it. One section of the two-piece blade construction includes opposed centrally apertured hub portions with intermediate, opposed, outwardly-extending blade portions, the hub extremities being transversely and preferably externally slotted. The other section of the two-piece blade construction includes opposed apertured hub portions with similar intermediate, opposed, outwardly-extending blade portions. This second mixer section is proportioned so that the opposed hub portions interfit within the slots of the hub portions of the first section whereby the respective apertures are aligned, the center lines coincident and the respective blade portions disposed at angles to each other, e.g., 90 degrees. The rod-like drive shaft is then forced through the centrally-disposed apertures of the interfitting blade sections, thereby locking the construction together.

The slot and interfitting hub portions of the two sections are dimensioned so as to be in sealing engagement when the implement is assembled. Thus, there are no food pockets or the like which create cleaning difficulties or represent a sanitary hazard.

The aperture in the lower hubs preferably does not extend all the way through. Thus, the lower end of the metallic shaft will not contact or mar internal surfaces of cookware.

To obtain the desired flat cross sections for mixing efficiency and yet present as little surface contact with cookware at the juncture of the side walls and bottom thereof, the blades are so constructed that the outermost portions are flat but the portions adjacent the hubs are rounded. The hub portions are escaloped or indented to increase the effective length of the blade portions and, thus, mixing efficiency.

The blades are constructed of any relatively soft material which will not, in use, damage the commercially available non-stick coatings and yet will have sufficient strength characteristics to handle the mixing loads. The blade material must also have sufficient rigidity, of course, so that it will not unduly distort when subjected to the mixing stresses; otherwise clashing of intermeshed blades will result. Cost considerations dictate the use of plastic materials at present, such materials found suitable including nylon, Teflon, polyethylene (preferably high density), polypropylene, Delrin (du Pont's registered trademark for thermoplastic acetal resin), and the like. We have found the nylon family of plastics to give excellent results in practice.

The centrally-disposed rod-like drive shaft is preferably nickel-plated steel, stainless steel or the like. In all cases it should be resistant to corrosion or attack by the materials to be mixed thereby. The extremity thereof which enters the chuck of the driving unit is configured to fit the particular chuck configuration encountered. Plastic adapters, which also are preferably made of the same plastic as the beater blades, e.g., nylon, are also available. These fit over the rod extremity to adapt the extremity for various chuck configurations. The rod is customarily cylindrical in cross section, although not necessarily. In some embodiments the rod may have a square, rectangular, or oval cross section or the like, and the apertures in the mixer sections should correspond. Such non-cylindrical cross sections may assist in the mixing action.

The present invention will be better understood from the following detailed description of a specific embodiment thereof, said description having reference to the accompanying drawings which form a part of this specification, wherein:

FIG. 1 is a perspective view of the assembled mixing implement of the present invention;

FIG. 2 is an elevation view of one of the two interfitting mixer sections;

FIG. 3 is an elevation view at 90° to that of FIG. 2;

FIG. 4 is a top plan view thereof;

FIG. 5 is an elevation view of the companion mixer section;

FIG. 6 is an elevation view at 90° to that of FIG. 5;

FIG. 7 is a bottom view thereof;

FIG. 8 is a fragmentary elevation view of the rod-like structure which locks the two mixer sections together and provides a drive shaft to rotate the same;

FIG. 9 is a top view thereof;

FIG. 10 is an elevation view of a typical adapter unit which in certain embodiments fits over the upper extremity of the drive shaft, such as the rod-like structure of FIG. 8, to adapt it to various power-unit chucks;

FIG. 11 is a top view thereof;

FIG. 12 is a bottom view thereof; and

FIG. 13 is a plan view showing the adapter unit of FIG. 10, in section, fitted over the fragmentary extremity of a drive shaft, such as the rod-like structure of FIG. 8 (rotated 90°).

Referring to FIG. 1, the mixing implement comprises rod 10 which is centrally disposed (and force fitted) through the apertures of interfitting plastic mixer sections 12 and 14. As shown in FIGS. 2 through 4, mixer section 12 comprises opposed hub portions 16 and 18, both of which are concentrically apertured at 20 and 22, and have transverse slots at 24 and 26, respectively.

Mixer section 12 also has outwardly-extending blade portions 28 and 30 which have substantially rounded cross sections adjacent the hubs as indicated at 28a and 30a, respectively. Intermediate the rounded cross sections are flattened portions 28b and 30b, respectively, which are the desired cross-sectional configuration for good mixing efficiency. While the mixing section thus has desired flattened portions, it also has rounded portions 28a and 30a to present only a minimal contacting line or surface when the implement contacts, rubs against or otherwise strikes the junction of the side wall and bottom of cookware. This substantially reduces frictional forces. Hub portions 16 and 18 are indented or escalloped at 32 and 34, respectively, to increase the effective length of blade portions 28 and 30 and thus improve mixing efficiency as well as save material.

Referring to FIGS. 5 through 7, the other mixer section is similar to that of FIGS. 2 through 4 except that the hub portions 36 and 38 are proportioned to fit within the slots 24 and 26, respectively, or 26 and 24, respectively, of mixer section 12. It is a simple, quick snap-into-place assembly operation. The width of the rubs 36 and 38 including flat areas 36a and 38a, respectively, and round areas 36b and 38b, respectively, substantially conform to the dimensions at the bottom of the respective slots to which they interfit, but the side walls are angled out at a slight angle, e.g., 2–4°, so as to form a tight seal thereagainst. The tight seal thus formed avoids the problem of food pockets or leakage of material into the slots, which would make cleaning difficult and would lead to unsanitary and hazardous conditions.

Like mixer section 12, interfitting mixer section 14 has similar outwardly-extending blade portions 40 and 42 which are rounded adjacent the hub as indicated at 40a and 42a, respectively, and flattened portions as indicated at 40b and 42b, respectively. When hub portions 36 and 38 are interfitted with the slots 24 and 26 of hub portions 16 and 18, the apertures at 44 and 46 are aligned and concentric with the apertures at 20 and 22. In the preferred embodiment which is shown, hub 38 is only partially apertured (and need not be apertured at all), that is, the aperture at 46 does not penetrate through the wall of the hub. This prevents contact of the rod 10 with the surfaces against which the lower portion of mixing section 14 may bear.

After mixer sections 12 and 14 are assembled by simply flexing and snapping the respective hubs into interfitting engagement, with the respective blade portions at right angles, the assembly is locked into one piece by force-fitting rod 10 through the concentric apertures indicated at 20, 22, 44 and 46. In FIG. 8, rod 10 is shown on a slightly magnified scale. It comprises a cylindrical shaft 48 having knurled portions of slightly-increased diameter at the areas where it engages the aperture surfaces of mixer sections 12 and 14, and thus tightly grips the same. The lower knurled portion which engages the internal surfaces of the apertures indicated at 22 and 46 is shown at 50. The knurled portion which engages the internal surfaces of the apertures at 20 and 44 is not shown because of the fragmentary presentation but is similar to that indicated at 50.

At the upper extremity, the rod has a reduced cross section as indicated at 52 but has adjacent thereto wing extensions 54 and 56, which are partly recessed in recesses 58 and 60, respectively (see FIG. 13). These are intended to conform rod 10 to the chuck requirements of a number of popular-type electric power units which can be employed to drive the mixer.

Since the chuck requirements of available mixers differ somewhat, an adapter unit can be provided for additional flexibility and versatility. One embodiment of an adapter unit is illustrated in FIGS. 10 through 12. It is fitted over the upper extremity of shaft 48, as indicated in the partial sectional view of FIG. 13. The adapter may comprise cylindrical body portion 62 with suitable upper registering configuration 64, lower flange portions 65 and 66, apertured lower portion 68 and internal configured portion 70 (FIG. 12). Wing extensions 54 and 56 register with the apertures 68a and 68b of the adapter unit as shown in FIG. 13. The particular configuration of the adapter unit or of the upper extremity of rod 10 is, of course, dictated by the requirements of the chuck assembly of the particular driving unit.

Mixer sections 12 and 14 may be of any suitable plastic which will not unduly flex under the mixing forces to which they are subjected in practice. By unduly flexing, it is meant that the flexure should not be sufficient to cause clashing of intermeshing mixing implements. The mixing forces depend upon the material being mixed, its viscosity, the temperature, the dimensions of the mixing blades, the speed of rotation and other factors well recognized by those skilled in the mixing art. For kitchen mixers, we prefer nylon, as aforementioned, although our invention is not limited thereto.

The material of construction of rod or shaft 10 can be quite critical because of the substantial torsional forces to which it is subjected. We prefer stainless steel, nickel-plated steel or the like. The great strength of rod 10 has the added benefit of stiffening the mixing implement as a whole. In fact, it has been found in certain embodiments that if high-strength materials are not used for rod 10, sufficient flexing occurs during heavy mixing operations as to cause clashing of intermeshed mixing implements with disastrous consequences.

While the present invention has been described in connection with certain specific embodiments, it should be understood that the invention is not limited thereto. Alternative modifications of the present invention will be apparent from the above description to those skilled in the art and such modifications are considered within the scope and spirit of the present invention even though they may not literally be covered by the language of the claims hereof.

Having thus described the invention, what is claimed is:

1. A multi-bladed mixing implement comprising:
   (a) a substantially-symmertical first mixer section including opposed, concentrically-apertured hub portions with intermediate, opposed, outwardly-extending blade portions, said hub portions being transversely slotted;
   (b) a substantially-symmetrical second mixer section including opposed, concentrically apertured hub portions with intermediate, opposed, outwardly-extending blade portions, said second mixer section being proportioned so that the opposed hub portions interfit with the slot of the hub portions of said first mixer section with the center lines coincident and the respective blade portions disposed at angles to each other; and (c) a substantially-rigid, rod-like structure fitted within the apertures of said first and said second mixer sections and extending beyond in one direction along the center line extension thereof so as to lock the structure together and provide a drive shaft to rotate said multi-bladed mixing implement.

2. The mixing implement of claim 1 wherein the slot of the hub portions of said first mixer section and the interfitting hub portions of said second mixer are dimensioned so as to be in sealing engagement whereby the mixing implement is readily cleansed.

3. The mixing implement of claim 1 wherein one of said hub portions of said second mixer section is only partially apertured.

4. The mixing implement of claim 1 wherein said blade portions of said first and said second mixer sections are rounded adjacent the hubs and are substantially flattened at intermediate locations.

5. The mixing implement of claim 1 wherein said first and said second mixer sections comprise molded plastic and said rod-like structure comprises a metal shaft.

6. The mixing implement of claim 5 wherein said molded plastic is nylon and said metal shaft is knurled so as to grip the internal surfaces of the apertures in the hub portions of said first and said second mixer sections.

7. The mixing implement of claim 1 wherein said hub portions of said first mixer section are indented intermediate the blade portions to increase the effective length of said blade portions.

8. The mixing implement of claim 1 wherein the extremity of the rod-like structure extending beyond said first and said second mixing sections is configured to drivably register with the chuck configuration of a power unit.

9. The mixing implement of claim 1 including an adapter unit having internal surfaces drivably configured to the extremity of said rod-like structure and outer surfaces drivably configured to adapt the mixing implement to the chuck configuration of a power unit.

References Cited

UNITED STATES PATENTS 2,161,867   6/1939   Kessel _____ 251—131

FOREIGN PATENTS 1,361,412   4/1964   France.
118,223   12/1926   Switzerland.

WILLIAM I. PRICE, *Primary Examiner.*